United States Patent
Holmen et al.

(10) Patent No.: US 8,786,417 B2
(45) Date of Patent: Jul. 22, 2014

(54) VEHICULAR WINDOW ADJUSTMENT BY MEANS OF A HAPTIC-ENABLED ROTARY CONTROL KNOB

(75) Inventors: John Holmen, Elyria, OH (US); Mehrdad H. Zadeh, Grand Blanc, MI (US); Mark Thompson, Flint, MI (US)

(73) Assignee: Kettering University, Flint, MI (US)

( * ) Notice: Subject to any disclaimer, the term of this patent is extended or adjusted under 35 U.S.C. 154(b) by 288 days.

(21) Appl. No.: 13/177,637

(22) Filed: Jul. 7, 2011

(65) Prior Publication Data

US 2013/0009757 A1 Jan. 10, 2013

(51) Int. Cl.
G08B 6/00 (2006.01)
B60Q 9/00 (2006.01)

(52) U.S. Cl.
USPC ........ 340/407.2; 340/425.5; 701/36; 715/701

(58) Field of Classification Search
USPC ......... 340/407.1, 407.2, 425.5; 345/173, 184; 700/17, 83; 701/1, 36; 702/94, 150; 715/701, 702, 771, 772
See application file for complete search history.

(56) References Cited

U.S. PATENT DOCUMENTS

| | | | | |
|---|---|---|---|---|
| 5,916,288 | A * | 6/1999 | Hartman | 701/36 |
| 6,034,337 | A * | 3/2000 | Siegert | 200/50.32 |
| 6,154,201 | A | 11/2000 | Levin et al. | |
| 6,396,006 | B1 * | 5/2002 | Yokoji et al. | 200/4 |
| 6,686,911 | B1 * | 2/2004 | Levin et al. | 345/184 |
| 6,833,517 | B2 | 12/2004 | Sotome et al. | |
| 7,224,262 | B2 * | 5/2007 | Simon et al. | 340/426.13 |
| 7,310,084 | B2 * | 12/2007 | Shitanaka et al. | 345/156 |
| 7,476,818 | B2 | 1/2009 | Nam | |
| 7,485,985 | B2 * | 2/2009 | Hagberg et al. | 307/10.8 |
| 7,489,303 | B1 | 2/2009 | Pryor | |
| 7,605,802 | B2 | 10/2009 | Hartkopp | |
| 7,633,485 | B2 * | 12/2009 | Reed et al. | 345/156 |
| 7,741,938 | B2 | 6/2010 | Kramlich | |
| 8,581,718 | B2 * | 11/2013 | Muller et al. | 340/459 |
| 2004/0154904 | A1 * | 8/2004 | Varga | 200/5 A |
| 2006/0155429 | A1 * | 7/2006 | Boone et al. | 701/1 |
| 2010/0005412 | A1 * | 1/2010 | Tauchi et al. | 715/771 |
| 2010/0188327 | A1 * | 7/2010 | Frid et al. | 345/156 |
| 2010/0200375 | A1 * | 8/2010 | Han et al. | 200/61.54 |
| 2010/0201503 | A1 | 8/2010 | Laurent et al. | |
| 2010/0288072 | A1 | 11/2010 | Springer et al. | |
| 2012/0131455 | A1 * | 5/2012 | Han et al. | 715/702 |
| 2012/0242465 | A1 * | 9/2012 | Murata et al. | 340/407.2 |
| 2013/0038431 | A1 * | 2/2013 | Springer et al. | 340/407.1 |

OTHER PUBLICATIONS

Grant, Danny, Two New Commercial Haptic Rotary Controllers, Proceedings of EuroHaptics 2004, Munich, Germany, pp. 451-455.

* cited by examiner

*Primary Examiner* — Stephen Burgdorf
*Assistant Examiner* — Benjamin C Lee
(74) *Attorney, Agent, or Firm* — Harness, Dickey & Pierce, P.L.C.

(57) ABSTRACT

A haptic assembly configured to control a plurality of windows on a vehicle. The assembly includes a haptic device configured to provide haptic feedback to a user when switching between the plurality of windows, and when moving a selected window of the plurality of windows between an open position and a closed position. The assembly can also include a graphical user interface (GUI) configured to display icons that represent each of the plurality of windows, and display a position of the selected window, wherein either the haptic device or the GUI can be used to switch between each of the plurality of windows to be controlled.

6 Claims, 4 Drawing Sheets

VEHICULAR WINDOW ADJUSTMENT BY MEANS OF A HAPTIC-ENABLED ROTARY CONTROL KNOB

FIELD

The present disclosure relates to vehicular window adjustment by means of haptic-enabled rotary control knob.

BACKGROUND

This section provides background information related to the present disclosure which is not necessarily prior art.

In recent years, control of vehicle instrumentation has been incorporated into a single rotary control knob. Such a knob has the ability to increase driving and task performance by utilizing senses such as touch that are least used during driving, as well as provide the driver with quick and easy access to instrumentation functionality. This allows the driver to maintain primary focus on driving, which increases safety for the driver.

SUMMARY

This section provides a general summary of the disclosure, and is not a comprehensive disclosure of its full scope or all of its features.

The present disclosure provides a vehicle including at least a first window and a second window that are controlled by a haptic device. The haptic device is configured to provide haptic feedback to a user when switching between the first window and the second window, and when moving a selected window of the first and second windows between an open position and a closed position.

The present disclosure also provides a haptic assembly configured to control a plurality of windows on a vehicle. The assembly includes a haptic device configured to provide haptic feedback to a user when switching between the plurality of windows, and when moving a selected window of the plurality of windows between an open position and a closed position. The assembly can also include a graphical user interface (GUI) configured to display icons that represent each of the plurality of windows, and display a position of the selected window, wherein either the haptic device or the GUI can be used to switch between each of the plurality of windows to be controlled.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
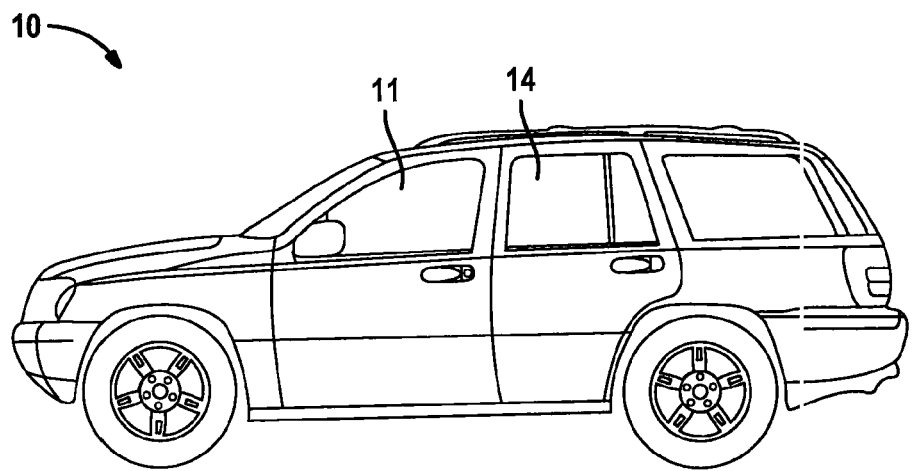
FIGS. 1A and 1B are a perspective view of a driver-side and a passenger-side of a vehicle including windows to be controlled using a haptic device.
Figure 1B:
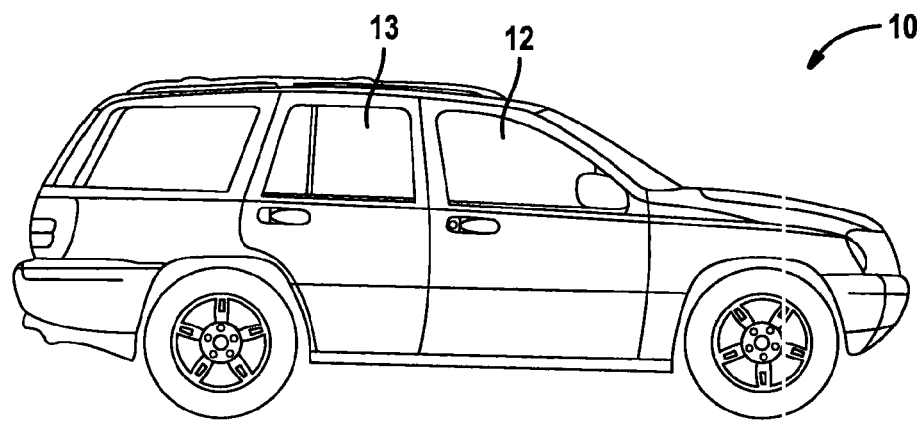

FIGS. 1A and 1B illustrate a vehicle 10 including a driver-side window 11 (FIG. 1A), a passenger-side window 12 (FIG. 1B), a passenger-side rear window 13 (FIG. 1B), and a driver-side rear window 14 (FIG. 1A). Now referring to FIG. 2, an exemplary dashboard 16 of vehicle 10 is illustrated. Dashboard 16 can be equipped with a graphical user interface (GUI) 18, which can be any type of GUI 18 known in the art. For example, GUI 18 can be a touch-based display device used in various vehicle navigation systems. In communication with GUI 18 is a haptic-controlled device 20. According to the present teachings, GUI 18 and haptic-controlled device 20 can be used to control windows 11-14 of vehicle 10. Alternatively, if vehicle 10 is not provided with GUI 18, only haptic-controlled device 20 can be used to control windows 11-14.

Regardless whether vehicle 10 is provided with GUI 18 and haptic-controlled device 20, or only haptic-controlled device 20, it should be understood that GUI 18 and haptic-controlled device 20 allows a driver of vehicle 10 to control windows 11-14 of vehicle 10 with haptic and visual feedback. More specifically, haptic-controlled device 20 allows the driver or a passenger of vehicle 10 to select a particular window 11, 12, 13, or 14 that needs to be raised or lowered, as well as control position of the selected window by allowing the driver to experience force-feedback when using haptic-controlled device 20. Using haptic-controlled device 20 allows driver to select window 11, 12, 13, or 14 and control its position, without removing focus from the road while driving. When GUI 18 is used in conjunction with haptic-controlled device 20, either GUI 18 or haptic-controlled device 20 may be used to select one of windows 11-14, while haptic-controlled device 20 may be used to control a position of the selected window.

Firstly, selection and control of windows 11-14 will be described using only haptic-controlled device 20. Haptic-controlled device 20 is a device that is configured to allow user to experience a perceptible force-change when using haptic-controlled device 20. The minimum threshold of force-change (also known as the "just noticeable difference") that a user can experience is generally between 100 to 150 mN. Accordingly, haptic-controlled device 20 is configured to provide force-feedback to the user when using the haptic controlled device 20.

Figure 2:
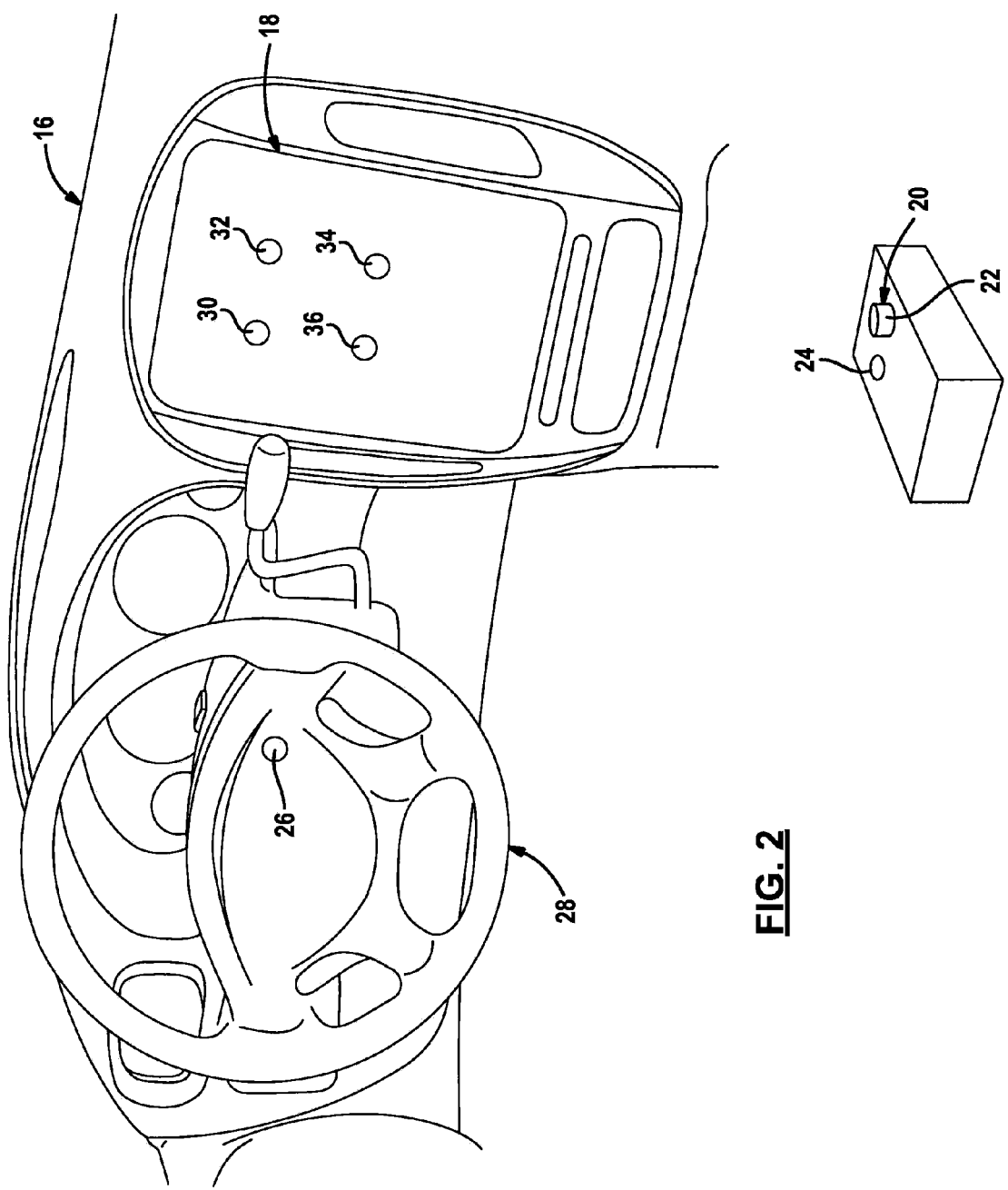
FIG. 2 is a schematic perspective view of a vehicle interior including a graphical user interface and a haptic device for controlling the vehicle windows.

As illustrated in FIG. 2, haptic-controlled device 20 can be a rotary knob 22 that is configured to adjust the amount of force-feedback that the user experiences when rotating knob 22. Various haptic-controlled rotary knobs 22 are known in the art that are currently used to control vehicle systems such as climate control, radio control, etc. Knob 22 used in vehicle 10 can be used to control windows 11-14, as well as other vehicle systems listed above. The force-feedback that knob 22 provides can include the perception of detents when knob 22 is rotated, or the force-feedback experienced can be the continual increase of resistance as knob 22 is rotated. Regardless, the force-feedback provided by knob 22 assists the user in determining various positions of knob 22 as it rotates, which assists in preventing the driver or user from having to remove his focus from the road when driving.

As described above, knob 22 can be configured to provide a constant force that causes the user to experience the feel of detents as knob 22 is rotated. When using such a knob 22 to select a particular window 11-14 that is to be raised or lowered, knob 22 can be configured to generate a constant force that must be overcome to reach a particular window. This constant force opposes the users rotation of knob 22 when approaching the "boundary" between each window 11-14.

For example, if the user would like to switch between window 11 and window 12, the user may rotate knob 22 in the clockwise direction. As user approaches the boundary between window 11 and window 12, the force-feedback generated by knob 22 can increase. Once sufficient force is exerted on knob 22 to overcome the boundary between window 11 and window 12, window 11 will switch to window 12. Similarly, if user would like to switch between window 12 and window 13, the user can continue to rotate knob 22 in the clockwise direction. As the user approaches the boundary between window 12 and window 13, the force-feedback generated by knob 22 will again increase until sufficient force is exerted on knob 22 to switch from window 12 to window 13. Similar boundaries can be provided between window 13 and window 14, as well as between window 14 and window 11. The amount of force-feedback provided by knob 22 at each boundary can be, for example, 0.83±0.01 N. Any desired force-feedback, however, can be used so long as the just-noticeable difference is experienced by the user.

Once the user exceeds the force necessary to switch between a pair of windows, an attracting force may be used to attract the user to the next window. For example, once a sufficient force has been exerted on knob 22 to overcome the boundary between window 11 and window 12, an attraction force can be experienced by the user once the user has reached window 12. Such a configuration is applicable to the boundary between each window 11-14.

Alternatively, the amount of force-feedback provided by knob 22 can be varied for each boundary between windows 11-14. For example, a preferred window (e.g., the driver-side window) can have the highest force (e.g., 1.34±0.02 N) at its boundary relative to windows 12 and 14. Alternatively, the amount of force-feedback provided by knob 22 can increase such that the force-feedback increases when moving from window 11 to window 14 (i.e., low force between windows 11 and 12, a slightly increased force between windows 12 and 13, an even more increased force between windows 13 and 14, and a greatest force between windows 14 and 11), or vice-versa.

To switch back from window 12 to window 11, for example, knob 22 can be rotated counter-clockwise. The force-feedback will again increase at the boundary between the windows accordingly until enough force is exerted on knob 22 to switch between windows 12 and 11. Such a configuration can be used for each of windows 11-14.

Each boundary between windows 11-14 can be experienced at approximately 90 degrees of rotation of knob 22. It should be understood, however, that any sufficient amount of rotation of knob 22 can be used for a selected boundary at which knob 22 will provide force-feedback to the user. Furthermore, as described above, user may rotate knob 22 both clockwise and counterclockwise to switch between windows 11-14. The present disclosure, however, should not be limited thereto. That is, knob 22 can also be configured to rotate only in the clockwise direction, or can be configured to rotate only in the counterclockwise direction. It is preferable, however, that knob 22 be configured to rotate in either direction to assist with the ease with which a window 11-14 may be selected.

Once the user has switched to the desired window 11, 12, 13, or 14, the user can "select" the window by depressing knob 22. That is, in addition to being rotatable, knob 22 can be configured to be depressable in the axial direction in a manner similar to a computer mouse. When knob 22 is depressed, the particular window will be selected. Once the particular window is selected, rotation of knob 22 can then be used to control a position of the window. That is, rotation of knob 22 in the counterclockwise direction can lower the selected window. Similarly, if the selected window has already been lowered, rotation of knob 22 in the clockwise direction can be used to raise the selected window.

To further assist the user, when the window is desired to be raised or lowered, knob 22 can be configured to provide varying force-feedback as knob 22 is rotated in either direction. For example, in the instance where a selected window is to be lowered, as the user rotates knob 22, the amount of force-feedback provided by knob 22 to the user can increase. More specifically, the greater amount of force-feedback experienced by the user can signify the distance that the selected window has been lowered.

Similarly, in the instance where a selected window is to be raised, as the user rotates knob 22, the amount of force-feedback provided by knob 22 to the user can decrease. That is, the lower amount of force-feedback experienced by the user can signify the distance that the selected window has been raised. Of course, it should be understood that knob 22 can also be configured to provide no force-feedback when raising and lowering the selected window. In this regard, assuming that the selected window is to be fully raised or lowered, knob 22 can be configured to rotate only 360 degrees. For example, if the selected window is to be fully lowered, the user would rotate knob 22 360 degrees. If the selected window is to be lowered half way down, knob 22 could be rotated 180 degrees, etc.

Further, rather than providing a constant increasing or decreasing force to the user as the window is raised or lowered, knob 22 can be configured in a manner similar to when knob 22 is used to switch between windows 11-14. That is, if the user wants to lower the selected window 25 percent, knob 22 can be configured to provide force-feedback at a boundary between 0 percent and 25 percent. If the user would like to lower the window 50 percent or 100 percent, another boundary can be provided between 25 percent and 50 percent, as well as between 50 percent and 100 percent. Regardless, it should be understood that knob 22 can be configured to provide any number of boundaries that correspond to various window positions that are desired (e.g., a boundary 10%, 20%, 30%, 33%, 40%, 50%, 60%, 75%, 80%, 90%, 100% and any desired boundary between 0% and 100%). Further, durations of the haptic feedback provided to the user can be used to signify the boundaries between the window levels.

Although knob 22 has been described above as being depressable, the present disclosure should not be limited thereto. In contrast, a selection device 24 such as a depressable button can be located proximate knob 22 for "selecting" a particular window after it has been located using the force-feedback generated by knob 22. In addition to selection device 24, a selection device 26 may also be located on the steering wheel 28 of the vehicle that allows the driver to select the appropriate window 11, 12, 13, or 14. Regardless, it should be understood that knob 22 can be depressable to enable the user to make a selection, or a separate button or switch can be used to "select" a particular window. In another embodiment, when knob 22 is used to control other vehicle systems, such as climate control and radio control, knob 22 can be depressable to select a particular window, while selection device 24 or 26 can be used to select the appropriate system (e.g. window, climate, radio, etc.) that is to be controlled by knob 22.

Now a vehicle 10 equipped with both GUI 18 and haptic-controlled device 20 will be described. For ease of description, it should be understood that haptic-controlled device 20 is knob 22 configured to provide force-feedback in any manner as described above. Further, knob 22 can be configured to be depressable, or can be associated with selection devices 24 and 26. Further, as noted above, it should be noted that GUI 18 can be a touch-enabled display.

Figure 3:
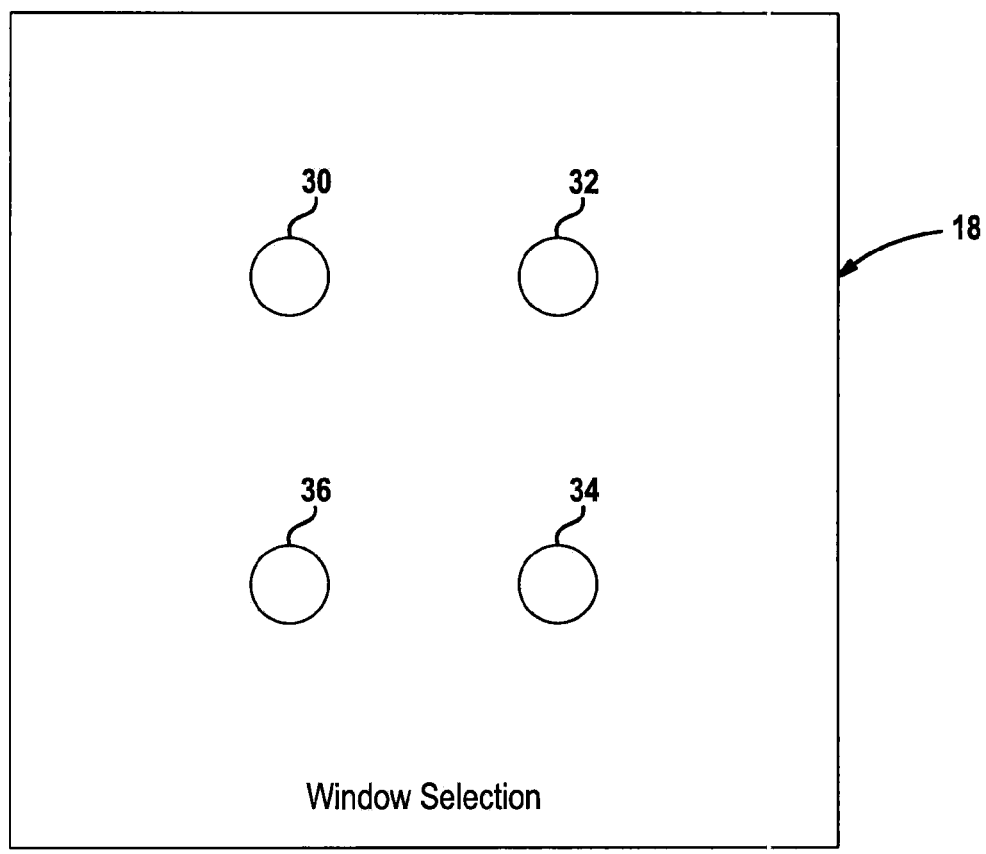
FIG. 3 is an exemplary screen displayed by a graphical user interface that can be used in conjunction with a haptic device to control windows of a vehicle.

When vehicle 10 is equipped with both GUI 18 and knob 22, the user can switch between and control windows 11-14 using both haptic-feedback and visual feedback. In this regard, when switching between windows 11-14, GUI 18 may display a configuration such as that illustrated in FIG. 3. Referring to FIG. 3, GUI 18 displays four icons 30, 32, 34, and 36. Each icon 30-36 corresponds to a particular window 11 to 14.

Figure 4:
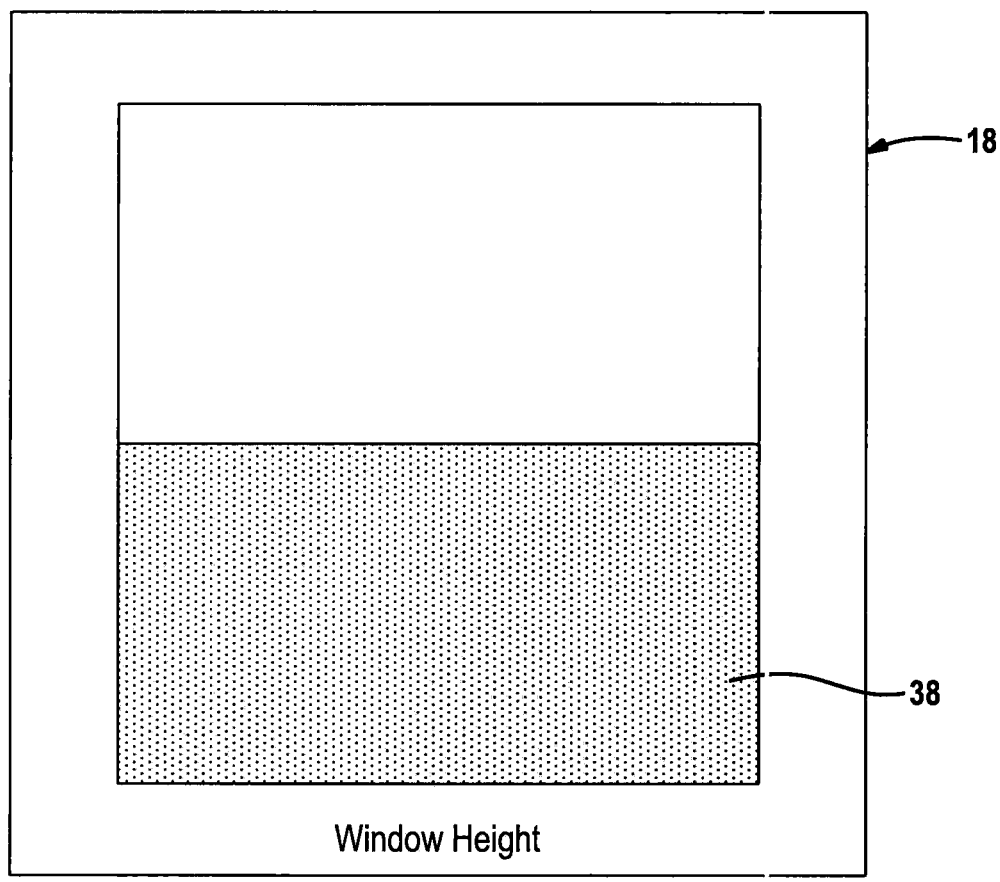
FIG. 4 is an exemplary screen displayed by a graphical user interface that can be used in conjunction with a haptic device used to control a position of a selected window of a vehicle.

In particular, icon 30 can correspond to window 11, icon 32 can correspond to window 12, icon 34 can correspond to window 13, and icon 36 can correspond to window 14. As GUI 18 can be a touch-enabled display, icons 30-36 can act as buttons that the user can touch to select a particular window 11, 12, 13, or 14 to control. Alternatively, the user can select a plurality of the windows 11-14 using GUI 18 for controlling with haptic device 20. If GUI 18 is not a touch-enabled display, GUI 18 can simply be used to visually represent which window 11 to 14 has been selected by haptic device 20 for control. Once a particular window or windows 11-14 has been selected for control using either haptic device 20 or GUI 18, GUI 18 can display a location of the selected window. That is, GUI 18 can display how far the selected window 38 has been opened or closed. Such a display is illustrated in FIG. 4. Alternatively, GUI 18 can display both the screen illustrated in FIG. 3 and the screen illustrated in FIG. 4 simultaneously in a side-by-side configuration.

Although the above disclosure has been described relative to a vehicle having four windows 11-14, the present disclosure should not be limited thereto. For example, the present disclosure is equally applicable to vehicles such as convertibles, pick-up trucks, and couples having only a driver-side window 11 and a passenger-side window 12. Further, haptic device 20 and GUI 18 can be used to control additional windows of the vehicle, if necessary, for example, a rear window on a vehicle such as an SUV, hatch-back, or station wagon.

The foregoing description of the embodiments has been provided for purposes of illustration and description only. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An assembly configured to control a plurality of windows on a vehicle, comprising:
    a rotary knob configured to provide haptic feedback to a user and control each of the plurality of windows, the rotary knob being operable to allow the user to:
    selectively switch between the plurality of windows by providing one or more first haptic feedbacks as the rotary knob is rotated that are indicative of a boundary between each of the plurality of windows, and after one of the plurality of windows is selected,
    move the selected window between a plurality of positions, the rotary knob providing a plurality of second haptic feedbacks as the knob is rotated, each of the plurality of second haptic feedbacks indicative of a boundary between each of the plurality of positions, and where each of the second haptic feedbacks has a different duration; and
    a graphical user interface (GUI) configured to display icons that represent each of the plurality of windows, and display a position of the selected window,
    wherein the rotary knob and the graphical user interface are operable to select one of the plurality of windows to be controlled.

2. The assembly of claim 1, wherein each of the first haptic feedbacks is a force that represents a boundary between each of the plurality of windows.

3. The assembly of claim 2, wherein the force representing each boundary is equal.

4. The assembly of claim 2, wherein the force representing each boundary is different.

5. The assembly of claim 2, wherein the force that represents the boundary at one window is greater than the force that represents the boundaries between the remaining windows.

6. The assembly of claim 1, wherein each of the second haptic feedbacks is a force that increases or decreases when the selected window is moved between the open and closed positions.

* * * * *